W. J. PHELPS.
CAN FILLING MACHINE.
APPLICATION FILED JUNE 19, 1911.

1,058,093.

Patented Apr. 8, 1913.

Walter J. Phelps,
Inventor,

Witnesses
Howard D. Orr.
F. T. Chapman.

By
Attorney

UNITED STATES PATENT OFFICE.

WALTER J. PHELPS, OF BALTIMORE, MARYLAND, ASSIGNOR OF ONE-HALF TO FRANK GEBBIE, OF ROCHESTER, NEW YORK.

CAN-FILLING MACHINE.

1,058,093.  Specification of Letters Patent.  Patented Apr. 8, 1913.

Application filed June 19, 1911. Serial No. 634,051.

*To all whom it may concern:*

Be it known, that I, WALTER J. PHELPS, a citizen of the United States, residing at Baltimore, State of Maryland, have invented a new and useful Can-Filling Machine, of which the following is a specification.

This invention has reference to improvements in can filling machines, and is designed more particularly for filling cans with milk, especially that form of milk known as evaporated milk, and its object is to provide a machine wherein the cans may be expeditiously filled without causing foaming of the milk.

While the machine of the present invention is in some or all of its parts adapted for the filling of receptacles with other substances than evaporated milk, it is especially adapted for the filling of cans with evaporated milk, and, without limiting the invention in its use to such substance, it will be considered in the following description that evaporated milk is the substance used to fill the cans, and it will be designated simply as milk.

The cans employed for holding the milk are of different sizes, and by properly arranging the machine it may be readily adapted to the filling of the commercial sizes of cans without material change in structure. The cans usually employed are made of metal and cylindrical in form and are finished with both heads in place, one head being wholly imperforate and the other head provided with a single small central perforation through which the milk is filled into the can and the air within the can is allowed to escape. The reason for employing a single small perforation is to facilitate the final sealing of the can, which is performed by the application of a small drop of solder hermetically closing the small perforation. The smaller the perforation the more readily is the sealing performed and the less the liability of any of the solder finding its way into the interior of the can as a loose drop. It, therefore, becomes necessary that the flow of milk into the can should be in the form of a fine stream, but if it is attempted to force such flow of milk, foaming ensues, and either the can is not filled as full as it should be, or a quantity of the foaming milk is forced to the outside of the can, smearing the top of the can and interfering materially with the soldering operation. Because of this liability of the milk to foam, the filling of the cans through a small orifice is necessarily quite slow, thus requiring a bulky machine carrying many cans at one time in order that the time of filling may be sufficiently prolonged to avoid foaming, and at the same time the output of the machine in filled cans be as large as an operator can handle.

With the present invention the filling orifice in the can may be made materially smaller than heretofore and the speed of filling may be increased without danger of foaming, so that the output of a comparatively small machine will be equal to or greater than the output of a very much more bulky machine where the filling is performed in a manner which if accelerated beyond a certain limit will produce foaming of the milk.

In the present invention the cans are filled while in the inverted position, that is, the head containing the filling orifice is downward and the milk flows up into the can, the air within the can being withdrawn or exhausted by means of a conduit introduced into the can and extending close to the imperforate head, which during the filling operation is uppermost. By a suitable suction apparatus any desired degree of vacuum or sub-atmospheric pressure is produced tending to cause the air within the can to flow through the small conduit opening near the then upper end of the can, while the milk may be caused to flow simply by the exertion of atmospheric pressure thereon into the can through the small central orifice, the air exhaust tube being sufficiently smaller in external diameter than the orifice through which it extends to admit of the inflow of milk with the required rapidity. As soon as that head of the can which in the filling operation is lowermost has become covered with the inflowing milk, the inlet for the milk becomes covered by the milk already within the can, so that the incoming stream of milk at once coalesces with the milk already in the can and its speed as soon as it enters the can is greatly reduced by spreading toward the sides of the can, so that while the speed of the stream of milk entering through the small central orifice may be comparatively great, such speed reduces so rapidly as soon as the stream enters the can that foaming is entirely obviated, even though the speed of the stream on entering be far in excess of the speed which in other methods of can filling through small orifices will inevitably produce foaming.

The present invention in one of its practical forms contemplates a rotatable milk reservoir carrying can supports having milk conduits leading thereto from the milk reservoir, and, also, air ducts terminating in fine air tubes which may be substantially concentric with the discharge ends of the milk ducts at the can supports and extend beyond such can supports in a substantially upright direction for such a distance that at their upper ends these small tubes are within a short distance of the upper ends of the cans when in place upon the can supports. The air tubes all lead to a common chamber, which in turn is provided with means for coupling it to an air exhaust apparatus of any appropriate character, so that the desired degree of sub-atmospheric pressure is maintained. The arrangement is such that an operator may at a certain point in the rotation of the machine remove filled cans therefrom and place empty cans therein, there being provided clamping means for the cans for automatically holding the cans in place and guide means whereby the operator is enabled to accurately place a can to cause the fine air tube to enter the can through the small central orifice in one head of the can.

While the apparatus of the present invention is designed to fill cans each of which has but a single small filling perforation or orifice at one end, while the other end is imperforate, and the can is filled when in the inverted position, and also an air tube is employed projecting through the filling perforation and of such diameter as to leave ample space for the inflow of milk whereby the milk enters the can at the bottom around the air tube and into the milk accumulating in the can, these features and other features disclosed herein are useful in can filling machines of different construction from the machine of the present invention. Some examples of other can filling machines are shown and described in my copending application for can filling apparatus, filed on even date herewith, and the invention in its broad aspects is therein claimed, wherefore the claims herein are not made so comprehensive as to include the disclosures of the said other application. It will be understood, however, that the invention disclosed herein is not limited to any exact conformity with the embodiment shown in the accompanying drawings forming part of this specification, but that the invention is susceptible of various modifications and changes in the practical embodiment thereof suiting it for different conditions, while at the same time retaining the salient features of the invention, and it will be further understood that any parts shown in the copending application aforesaid adapted to the present structure may be used in place of like parts herein shown.

Referring to the drawings, there is shown a base 1 which may be taken as typical of any suitable base or support, and this base is shown as provided with a short central pedestal 2 bored to receive a stem or stud 3, the function of which is to guide and centralize a hub 4 resting at one end on the pedestal 2 through the intermediary of anti-friction bearings 5, shown in the drawings as ball bearings, although by no means limited to such arrangement. The hub 4 is secured to the stem 3 by a suitable set screw 6, or more than one set screw, if desired, and is provided with a bevel gear 7 shown as formed in one piece with the hub, but, of course, it will be understood that this bevel gear may be separately formed, as is often the practice. The bevel gear 7 is engaged by a bevel pinion 8 on one end of a counter-shaft 9, mounted in bearings 10 supported by legs 11 which may rise from the floor or other support to which the base 1 is secured. One end of the shaft 9 is provided with a pulley 12 for the application of power through a belt The hub 4 is provided with radiating arms 13 carrying at their outer ends a ring 14 serving as a support for an annular reservoir 15 of trough shape, that is, it is shown as provided with inner and outer walls in parallel relation one to the other with a bottom portion resting on the ring 14 and the upper end open, although in practice a suitable cover may be provided for excluding dirt, but it is deemed unnecessary to show a cover in the drawings.

Figures 4, 7:
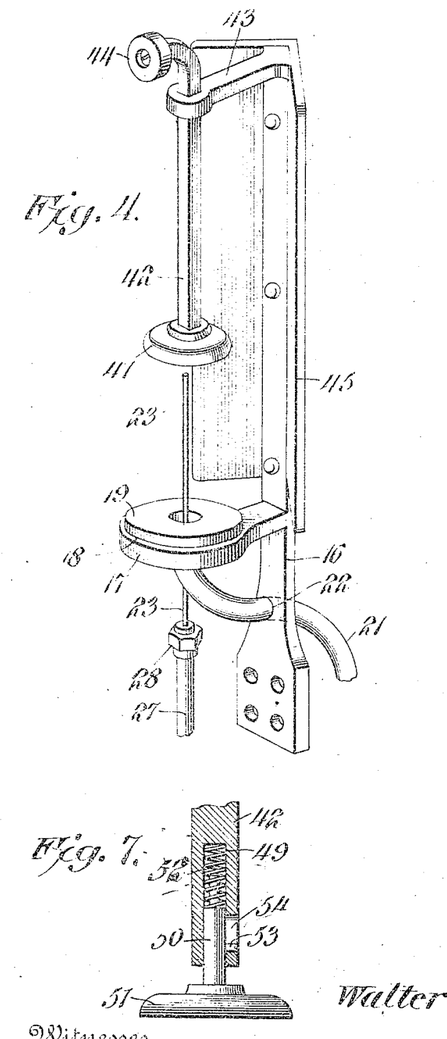
Fig. 4 is a perspective view of one of the can supports and guides detached from the machine and with the air and milk conduits broken away.
Fig. 7 is a detail section of a modified form of presser or clamp member for holding the cans in place.
Figures 5, 6:
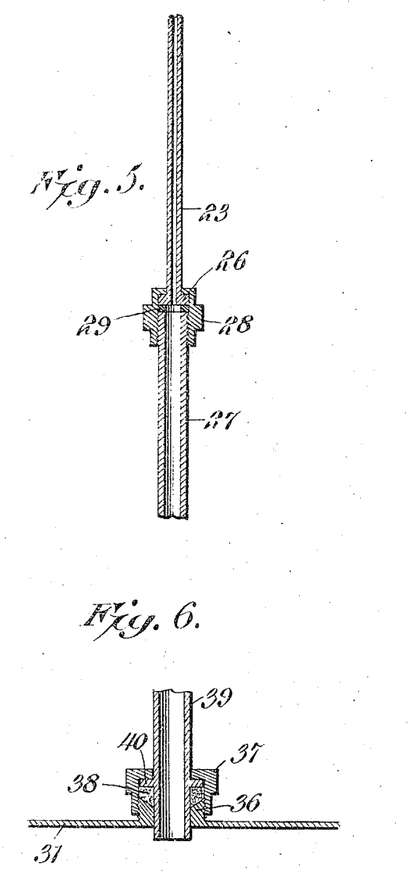
Fig. 5 is a longitudinal section of the cam entering end of the air conduit and adjacent parts showing one means of connecting the small air tube with the larger portion of the air tube.
Fig. 6 is a longitudinal section of the air exhaust conduit where entering the common exhaust chamber connected to the several air ducts leading to the can supports.

Fast to the outer wall of the reservoir 15 at appropriate intervals are the lower ends of posts 16 which may be secured to the reservoir by riveting or otherwise, and each post has formed on or secured to it at an appropriate distance above the reservoir, an outstanding shelf or carrier 17, best shown in Fig. 4. The shelf at a point remote from its post 16 is expanded into an approximately circular form, and is provided on what constitutes the upper surface when the machine is in operative position, with a circular recess 18, in which is seated an annular gasket 19 of suitable material, usually soft rubber, the diameter of the gasket being such as to readily support a can 20 of a size such as is used for containing milk. The shelf 17 at a point central to the recess 18 is provided with a passage traversed by one end of a pipe or tube 21, which is of a length to extend through a hole 22 in the appropriate post 16, and to near the bottom of the interior of the reservoir 15, preferably at the edge thereof adjacent the inner wall of the reservoir. The pipe or tube 21 extends partly through the gasket 19 and the latter may fit the corresponding end of the pipe or tube sufficiently close to render the connection fluid tight. That end of the pipe 21 which extends into the gasket is entered by a small tube 23 which may be soldered or otherwise secured to the pipe 21, so as to be approximately concentric with the end of the pipe 21 through which the tube 23 extends. The can 20 is provided with a single central opening 24 in one head, the other head 25 being imperforate, and the can being closed and finished except for the perforation 24. It is desirable that the perforation 24 be of comparatively small size to facilitate the final sealing of the can by means of a small drop of solder applied to the head of the can at the perforation 24, and the smaller the perforation or opening 24 is, the less solder is necessary and the less there is any likelihood of any of the solder falling into the interior of the can. The tube 23, therefore, is of small diameter, practice demonstrating that a tube one thirty-second of an inch inside diameter is sufficiently large. Such a tube is quite frail, and, moreover, it is desirable that the length of such a minute tube be kept as short as practicable. For this reason the tube close to its point of entrance into the pipe 21 is formed with a head or flange 26, shown in Fig. 5, and to this flanged end of the tube 23 there is applied a pipe 27 which may be of considerably larger diameter than the tube 23, and is connected to the tube 23 by a coupling 28 shaped to house the head 26, and in order that the joint may be substantially air tight, a washer 29 of packing is introduced between the head 26 and the corresponding end of the pipe 27.

At a point substantially coincident with the axis of rotation of the reservoir 15 and in part encircled by the reservoir is a housing 30 in the form of a cylinder closed at the ends by heads 31, 32, respectively. The housing 30 has connected thereto the corresponding ends of the pipe 27, which may include elbows and other connections suitable for the purpose, so that the pipes 27 are carried under the ring 14 and thence upward through supports 33 fast on the outer wall of the reservoir, wherefore the ends of the pipes 27 carrying the tubes 23 are supported in the proper direction to have the tubes 23 pass through and be made fast to the pipes 21, and, also, extend through the shelves 17 and gaskets 19 until the upper ends of the tubes 23 are each at an appropriate distance from the inner wall of the head 25 of a can 20 applied to the gasket 19.

Figure 1:
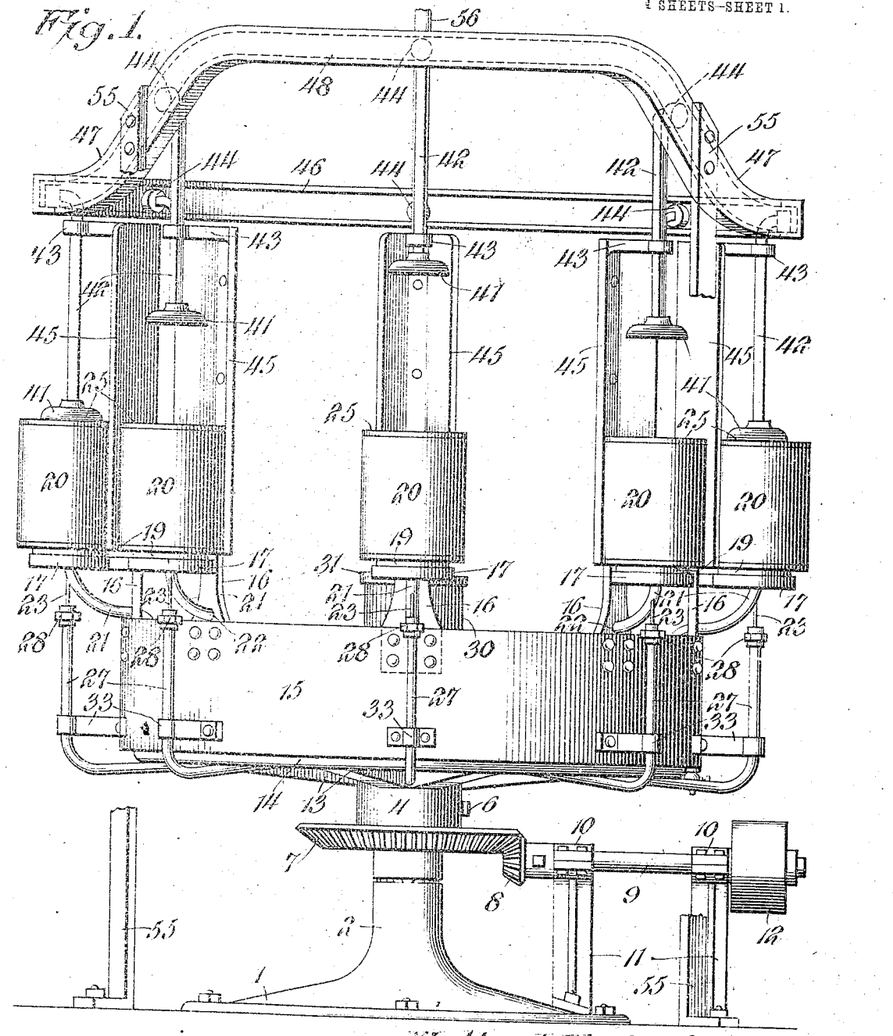
—Figure 1 is an elevation of a can filling machine embodying the present invention, with some parts broken away, the view being taken from the point where the operator stands.
Figure 2:
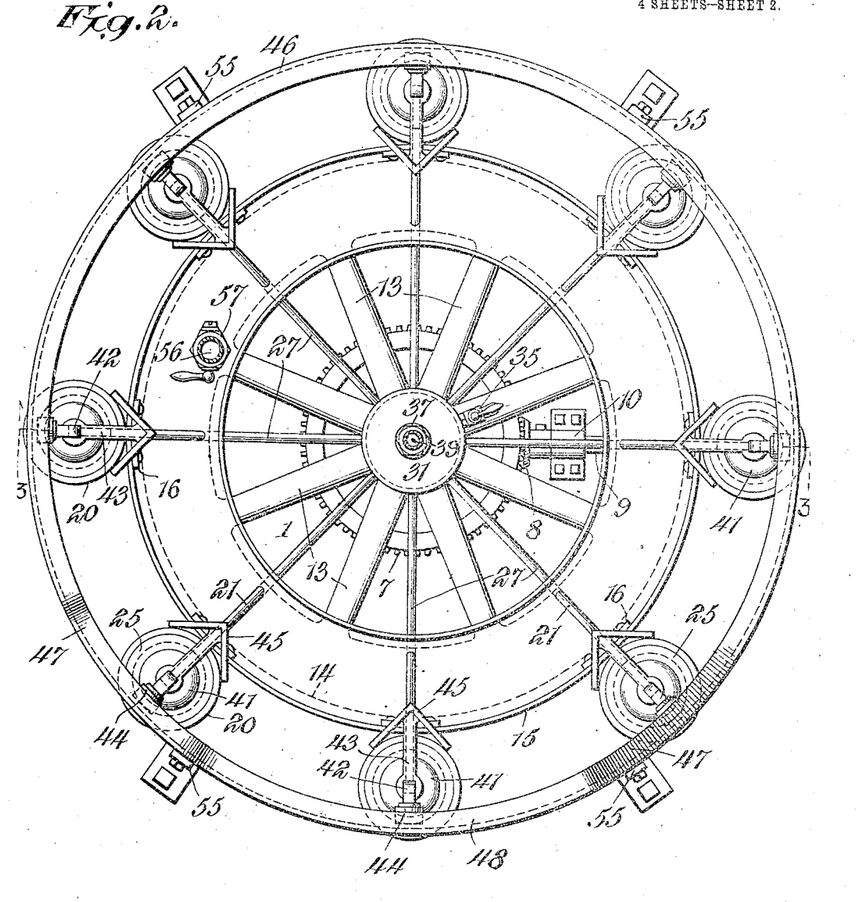
Fig. 2 is a plan view, the air exhaust and milk feed pipes being shown in cross section.
Figure 3:
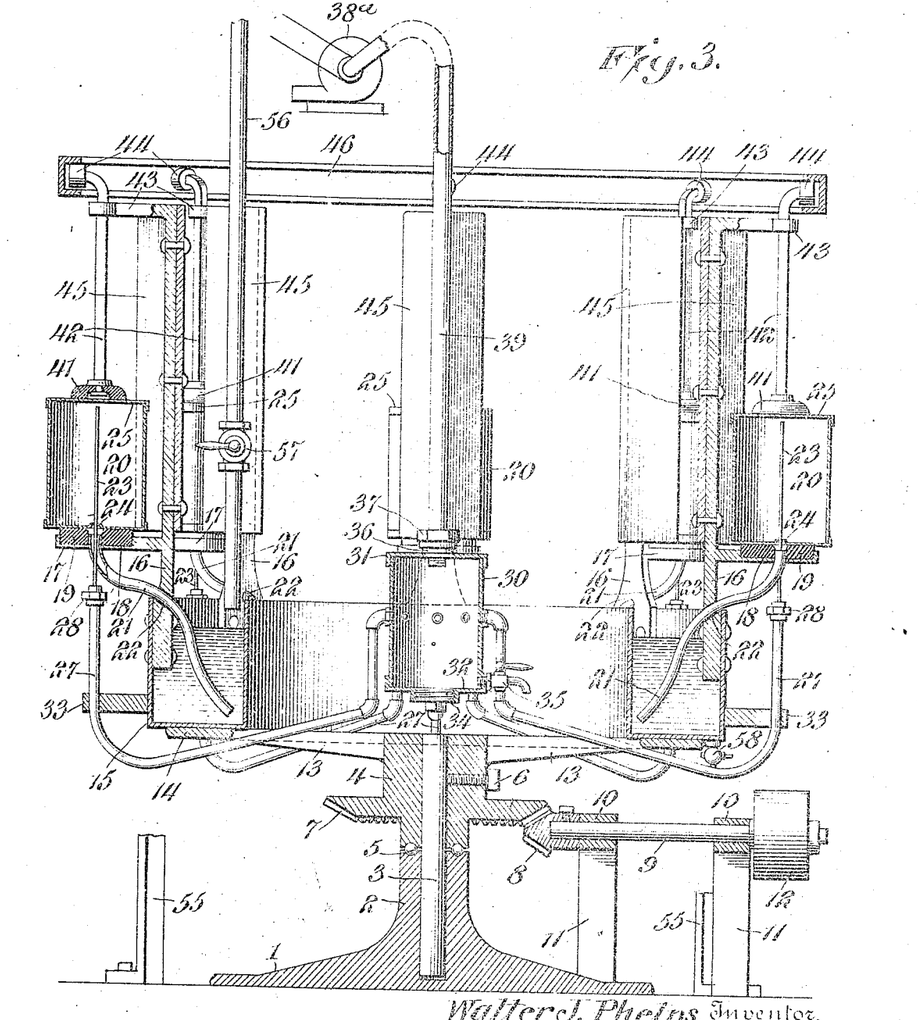
Fig. 3 is a section on the line 3—3 of Fig. 2.

The head 32 of the housing 30 is provided with a removable screw plug 34, whereby the housing 30 may be opened for cleansing, and a drain cock 35 is also provided where it is desirable to drain off any liquids which may find their way into the housing 30. The head 31 is formed with a central boss 36 to which is applied a packing gland 37 confining packing 38 to the boss 36, and through the gland and boss there extends one end of a pipe 39 formed with a flange 40 adapted to be housed by the gland 37 against the packing 38. This pipe 39 is carried to an appropriate suction apparatus shown schematically at 39ª in Fig. 3 without, however, any limitation of the invention to any particular suction apparatus. It is designed that the pipe 39 be held stationary while the housing 30 rotates with the rotatable portions of the machine, and, therefore, the end of the pipe 39 communicating with the housing 30 is swiveled to the housing by means of the packing gland on the head 31, so that the casing may rotate while the pipe 39 stands still, and at the same time an air tight joint be provided. It is also of advantage to have the cans 20 engage the gaskets 19 with sufficient force to render the junction air tight, and while the exhaustion of air from the cans will serve to establish such an air tight joint, it is best not to rely thereupon, but to cause the cans to be pressed against the gaskets 19 by mechanical pressure. This is provided by means of plunger or clamp heads 41 which may be formed of a sufficiently elastic material, such as rubber, each head being carried on one end of a stem 42, the other end of which extends through a guide bracket 43, and is then bent at an angle and there carries a roller 44. Each bracket 43 projects from the upper end of a respective post 16 which is of sufficient length for the purpose, and to each post there is made fast a V-shape guide 45 of sufficient length to receive and center a can when above a corresponding tube 23, and to continue to center and guide the can while it is moved downward until in engagement with the seat or gasket 19. The stem 42 is of sufficient length to move out of the way of a can when first moved into engagement with the guide 45, and to then follow the can and ultimately engage the head 25 to clamp the can against the seat 19. For the automatic actuation of the clamp heads 41 there is provided a cam track 46, which may be made of channel iron, and for an appropriate portion of its length extending substantially horizontally, assuming that the machine is in operative position, and then joined by curved portions 47 with another horizontal portion 48 more elevated than the main portion of the cam track 46. The portion 48 is much less extensive than the main portion of the cam track 46, while the curved portions 47 are so shaped as to impart a comparatively rapid movement to the stem 42 and the heads 41 carried thereby. The rollers 44 engage in the channel of the cam track, and the stems 42 are made of non-circular cross section with the guiding brackets 43 of similar cross section, so that the rollers 42 will always remain within the cam track.

The heads 41 are made of elastic material, so that when engaging the cans they may yield to accommodate themselves to slight differences in heights of cans and to other inaccuracies, and, also, by their elasticity engage the cans with appropriate force. This same function may be brought about by the arrangement shown in Fig. 7, where the stem 42 is shown as provided with an axial recess 49 opening at one end of the stem, and this recess is entered by a pin 50 carrying at one end a head 51 which may be similar to the head 41 except that it need not be of elastic material. The pin 50 confines within the recess 49 a spring 52, which will yield to superior pressure applied to the head 51. The pin 50 carries a limiting stop pin 53 projecting through a slot 54 in one side of the stem 42. The cam track 46 is shown as supported on legs 55 rising from the floor upon which the base 1 is secured, but it will be understood that any other suitable support for the cam track may be provided The perforation 24 in the cans is customarily formed by a punching tool, which simply pierces the head of the can without removing any of the material thereof, so that the material of the can surrounding the perforation slopes inwardly, thus facilitating the entrance of the minute tube 23 into the can.

Because of the function of the tubes 21 and 23, the tube 21 may be termed the milk tube and the tube 23 the air tube, the pipe 27 constituting a continuation of the air tube.

The portion 48 of the cam track 46 is of such length as to cause the clamp head on the end of the stem 42 to release a can as it approaches the operator, who is assumed to be located at a point about central of the length of the section 48 of the cam track, so that the operator may lift a filled can to an appropriate height to be free from the tube 23, and may then replace the removed can by an empty can and permit the latter to move toward the supporting gasket 19, the guide 45 centering the can so the air tube 23 will readily enter the perforation 24, and by the time this operation is performed the roller 44 of the stem 42, raised to release the can, enters that curved section 47 of the cam track 46 in the order of progression of the machine, and this curved portion causes the clamp head to move down against the can and clamp the can against the gasket 19 during the filling operation, the parts being so related that this operation is completed by the time the roller 44 of the stem 42 under consideration reaches the other curved portion 47 of the cam track in its path, to be there elevated to the upper section 48 of the cam track The sub-atmospheric pressure causing the flow of air through the air tubes 23 may be maintained continuously by the suction pipe 39 and this operation will not be materially affected by the removal of a can from covering relation to an air tube 23, for the minute bore of such tube will not permit the air to flow through it with such rapidity that a desirable vacuum may not be maintained.

In the operation of the machine, which is continuous, there is but one air tube 23 uncovered at any one time, and this is only for a short period of time representing but a small fraction of the time the air tube is within a can during one complete cycle of operation. Considering a can just placed in position by the operator, it is first centered by the guide 45 above the upper end of the air tube, and is then quickly moved downward while being held against the guide 45, thus causing the air tube to enter the perforation 24, which latter, though small, is still considerably larger than the air tube. The can quickly drops to the gasket 19 and at once the air is being withdrawn or exhausted from the interior of the can. The level of milk within the reservoir 15 is below the gasket 19 and consequently below the lowest portion of the inverted can when on its seat. The milk therefore will not flow spontaneously to the can, but must be forced thereinto by pressure. By producing sub-atmospheric pressure within the can, which production of sub atmospheric pressure begins at once and before the clamp head 41 or 51, as the case may be, is brought into engagement with the can, atmospheric pressure on the milk within the reservoir will cause it to flow through the appropriate milk tube 21 to the interior of the gasket 19, and from thence to the interior of the can through the perforation 24 about the air tube, the latter not filling the perforation 24. As soon as the clamp head engages the can, the latter is forced firmly against the gasket 19 and any slight leakage of air which may have existed while the can simply rested on the gasket by its own weight and the pressure brought about by the increasing vacuum within the can, is entirely eliminated, so that such sub-atmospheric pressure is established within the can as is determined by the suction apparatus and the milk will flow into the can with commensurate speed. As soon as the head of the can lowermost is covered with milk, the latter will no longer flow in a distinct stream into the can, but will be resisted by the increased quantity of milk in the can and will spread toward the sides of the can, thus preventing any formation of jets of milk and entirely obviating foaming of the milk, while at the same time the inflow of milk may be materially more rapid than is the case where the milk passes into the can in the form of a jet during approximately the full filling operation. From this it results that a much higher pressure upon the milk is feasible and a smaller opening in the can may be employed than is the case where the speed of entrance of milk into the can is limited by the liability of foaming, such foaming not occurring when the inflowing stream is slow. Because of the increased inflow of milk, the time of filling the can is correspondingly reduced and the number of cans necessarily present in the machine at any one time is correspondingly reduced, so that a comparatively small machine will fill the same number of cans as a much larger machine where the milk enters the can in the form of a jet, and forming is liable to occur.

The amount of milk entering the can is determined by the length of the air tube 23, for as soon as the open end of this tube is covered the milk will flow through the tube and ultimately into the housing or vacuum chamber 30, so that the cans are all filled to the same extent. As the operator lifts the filled can from its seat the air tube passes out from the perforation 24, but this perforation is so small that the surface tension of the milk and the capillary attraction of the walls of the perforation acting on the milk prevents any escape of the milk from the can, since air cannot enter the can to permit the escape of milk, and there is no loss of milk due to the fact that the cans are removed from the machine in the inverted position. Furthermore, as a can is released from the seat formed by the gasket 19, the presence of a partial vacuum within the can will cause a slight in-rush of air through the perforation 24, thus sucking in any slight accumulation of milk which may be found at the walls of the perforation, thereby cleansing these walls sufficiently to permit the closing of the perforation by solder without additional cleansing, as would be the case were a globule of milk to remain at the mouth of the perforation.

While the operation of the machine as shown and described is continuous, it will be understood that the sub-atmospheric pressure may be established intermittently in the cans in like manner as super-atmospheric pressure is utilized in some of the forms shown in the aforesaid co-pending application. It will be further understood that while sub-atmospheric pressure is produced in the cans to cause the inflow of milk by atmospheric pressure exerted on the milk, the inflow of milk into the cans is due to a superior pressure acting on the milk to force it into the cans, although this superior pressure does not in the specific instance herein shown exceed atmospheric pressure, the specific forms of the invention wherein the pressure causing the milk to flow into the cans exceeds atmospheric pressure being reserved for the said co-pending application.

It is necessary from time to time to replenish the supply of milk in the reservoir 15, and for this purpose there is provided a pipe 56 coming from a suitable source of milk supply (not shown), and having its discharge end in operative relation to the reservoir 15. This pipe is provided with a suitable cut off valve 57, whereby milk may be admitted to the reservoir 15 whenever the operator so desires.

Since more or less milk finding its way into the air tubes 23 will ultimately reach the chamber 30 and accumulate therein, it may be drawn off from time to time by means of the valve 35. Whenever cleansing becomes necessary the interior of the chamber or casing 30 is made accessible by removing the plug 34.

It may at times be desirable to drain the reservoir, and for this purpose the latter is provided with a drain valve 58

The process of canning liquids disclosed but not claimed is described and claimed in my copending application Serial No. 669,886, filed on January 6, 1912, for process of canning liquids.

What is claimed is:—

1. In a machine for filling cans through a small perforation in each can of a size to prevent spontaneous outflow of liquid therethrough, a rotatable reservoir for the material to be filled into the can, a series of carriers on the reservoir, each carrier having means for supporting a can in an inverted position with the small perforation downward, a conduit leading from the reservoir to each can support in position to deliver the material to the exterior of the can adjacent the small perforation, and an air suction tube for each can carried by and participating in the rotative movement of the reservoir, said air tube extending beyond the can engaging portion of the can support to enter a can through the small perforation to substantially the level to which the can is to be filled.

2. In a machine for filling cans through a small perforation in each can of a size to prevent spontaneous outflow of liquid therethrough, a rotatable reservoir for the material to be filled into the can, a series of carriers on the reservoir, each carrier having means for supporting a can in an inverted position with the small perforation downward, a conduit leading from the reservoir to each can support in position to deliver the material to the exterior of the can adjacent the small perforation, and an air suction tube for each can carried by and participating in the rotative movement of the reservoir, said air tube extending beyond the can engaging portion of the can support to enter a can through the small perforation to substantially the level to which the can is to be filled, the air tube where entering the can being of a diameter to pass through the perforation in the can and leave space for the entrance of the material to be filled into the can, said air tube extending through and being fastened to the conduit for the material to be filled into the can where adjacent the support for the can.

3. In a machine for filling cans each with a single small filling perforation at one end of a size to prevent spontaneous outflow of liquid therethrough, a seat for the perforated end of the can for supporting the can in an inverted position, clamping means for engaging the other end of the can for holding it to the seat, and material conducting and air exhausting means associated with the seat or support for the can to exhaust air from the end of the can remote from the perforation and to conduct the material to be filled into the can to the perforated end of the can.

4. In a machine for filling cans each with a small filling perforation at one end of a size to prevent spontaneous outflow of liquid therethrough, a rotatable reservoir for the material to be filled into the cans, a circular series of can supports carried by the reservoir, a can guide carried by each support, a clamping member for the can carrie by each support, a conduit leading from the reservoir to each support, an air exhaust tube leading to each support and through the same and of a length and size to enter an inverted can through the small perforation to substantially the level to which the can is to be filled, and means for operating the clamps to engage and release the cans at predetermined points in the rotation of the series of cans with the reservoir.

5. In a machine for filling cans each with a small filling perforation at one end of a size to prevent spontaneous outflow of liquid therethrough, a rotatable reservoir for the material to be filled into the cans, a circular series of can supports carried by the reservoir, a can guide carried by each support, a clamping member for the can carried by each support, a conduit leading from the reservoir to each support, an air exhaust tube leading to each support and through the same and of a length and size to enter an inverted can through the small perforation to substantially the level to which the can is to be filled, and means for operating the clamps to engage and release the cans at predetermined points in the rotation of the series of cans with the reservoir, the machine being provided with an exhaust chamber common to the air tubes and the chamber having an exhaust pipe leading therefrom.

6. In a machine for filling cans each with a small filling perforation at one end of a size to prevent spontaneous outflow of liquid therethrough, a rotatable reservoir for the material to be filled into the cans, a circular series of can supports carried by the reservoir, a can guide carried by each support, a clamping member for the can carried by each support, a conduit leading from the reservoir to each support, an air exhaust tube leading to each support and through the same and of a length and size to enter an inverted can through the small perforation to substantially the level to which the can is to be filled, and means for operating the clamps to engage and release the cans at predetermined points in the rotation of the series of cans with the reservoir, the machine being provided with an exhaust chamber common to the air tubes and the chamber having an exhaust pipe leading therefrom, said exhaust chamber being also provided with means for the withdrawal of liquid therefrom at will.

7. An can filling machine for filling liquid into cans through a single small filling perforation in one end of each can of a size to prevent spontaneous outflow of liquid therethrough, comprising an annular reservoir, a support for said reservoir, means for rotating the support and reservoir, a circular series of can supports carried by the reservoir, each support being provided with an elastic member for receiving a can in an inverted position with the perforated end downward, a can guide carried by each support, a clamp member for each can carried by the can support, a cam track for engaging the clamp members to move them into and out of engagement with the cans at predetermined points in the rotation of the rotatable parts of the machine, conduits leading from the reservoir to the can supports and terminating in position to deliver material to the filling perforation of the can exterior to the can, an exhaust chamber rotatable with the reservoir and provided with means for the exhaustion of air therefrom, and air conduits leading from the exhaust chamber to the can supports, each conduit being there provided with an extension of a diameter and length to enter a can through the small perforation therein and extend to substantially the level to which the can is to be filled, the diameter of the air conduit and the diameter of the perforation being so related as to leave room for the inflow of material to the can through the same perforation.

8. In a machine for filling liquid into cans, a rotatable reservoir for the liquid, can carriers each including elastic can supports and fixed on and rotatable with the reservoir, means for directing liquid from the reservoir through the can supports to cans thereon, an exhaust tube individual to each can carrier and of a length and size to enter an inverted can on the can support through a small filling perforation in said can, and a centralized exhaust chamber communicating with all the exhaust tubes.

9. In a machine for filling liquid into cans, a rotatable reservoir for the liquid, can carriers each including elastic can supports and fixed on and rotatable with the reservoir, means for directing liquid from the reservoir through the can supports to cans thereon, an exhaust tube individual to each can carrier and of a length and size to enter an inverted can on the can support through a small filling perforation in said can, and a centralized exhaust chamber communicating with all the exhaust tubes, said exhaust tubes and connections being freely open from the end entering the can to the common exhaust chamber 10. In a machine for filling cans each through a small filling perforation in one end of a size to prevent spontaneous outflow of liquid therethrough when the can is inverted, a rotatable series of can carriers adapted to receive the cans in the inverted position with the filling perforation downward, a filling conduit and an exhaust air tube in normally fixed relation one to the other and to the respective can support, and means individual to each support for clamping a can thereto with the perforation of the inverted can in air tight communication with the filling conduit.

11. In a machine for filling liquid into cans each of which is provided with a single small filling perforation in one end of a size to prevent spontaneous outflow of liquid therethrough when the can is inverted, a fluid directing conduit and an exhaust air tube for each can in normally fixed relation one to the other, the air tube being of a length and size to enter the can through the small filling perforation to a point adjacent the imperforate end of the can, and means for permitting the movement of the can the full length of the entrance of the air tube into the can into sealing relation to the liquid directing conduit.

12. In a machine for filling liquid into cans each of which is provided with a single small filling perforation in one end of a size to prevent spontaneous outflow of liquid therethrough when the can is inverted, a fluid directing conduit and an exhaust air tube for each can in normally fixed relation one to the other, the air tube being of a length and size to enter the can through the small filling perforation to a point adjacent the imperforate end of the can, and means for permitting movement of the can the full length of the entrance of the air tube into the can into sealing relation to the liquid directing conduit, the machine being also provided with a can positioning guide of a length equal to the length of movement of the can, and a clamping means for engaging the end of the can remote from that entered by the air tube, said clamping means having an extent of movement sufficient to permit the stated movement of the can.

13. In a machine for filling liquid into cans each of which is provided with a single small filling perforation of a size to prevent spontaneous outflow of liquid therethrough when the can is inverted, a series of can carriers, a reservoir for liquid located at a lower level than the can carriers, conduits extending from the reservoir to and through each can carrier, and exhaust air tubes one for each can carrier in normally fixed relation to the can carrier and liquid conduit, the air tube having a terminal portion of a size and length to enter a can when placed on the carrier in the inverted position to a point adjacent the imperforate end of the can.

14. In a machine for filling cans each with a single small filling perforation at one end, a relatively fixed support for the perforated end of the can for receiving the latter in the inverted position and including elastic can engaging means for sealing the can about the perforation, means associated with the seat or support for the can for removing air from the can and directing material to the small perforation through the seat, and a clamping means for engaging the end of the can remote from the seat and movable into and out of engagement with said can.

15. The combination with a can support, of an air tube fixed to and extending through the support, a can guide fixed to said support to one side of the air tube and extending from the support in substantially parallel relation to and in the same direction as the air tube, and can clamping means movable lengthwise of the guide.

16. The combination with a can support, of an air tube fixed to and extending through the support, a can guide fixed to said support to one side of the air tube and extending from the support in substantially parallel relation to and in the same direction as the air tube, and can clamping means movable lengthwise of the guide, the can clamping means having a range of movement greater than the length of the can to be clamped and the guide being longer than the length of the can to be clamped.

17. The combination with a can support, of an air tube in normally fixed relation to the support and extending therethrough for a distance to enter a can upon the support to a point adjacent the end of the can remote from the support, and an angular can guide carried by the support and extending therefrom in the same direction as the air tube and of a length to guide a can along the tube until in engagement with the support.

In testimony, that I claim the foregoing as my own, I have hereto affixed my signature in the presence of two witnesses.

WALTER J. PHELPS.

Witnesses:
 JOHN H. SIGGERS,
 DAVID R. WAGNER.